Sept. 10, 1968     T. A. MOORE     3,400,458
LEATHERCRAFT TOOL
Filed Nov. 8, 1966
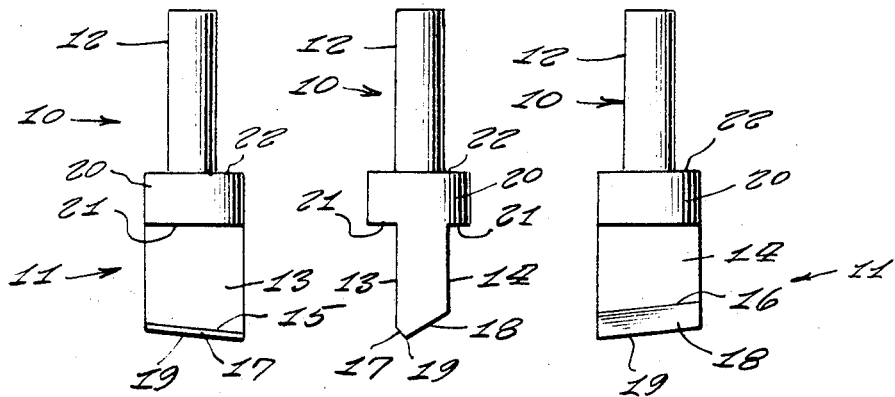
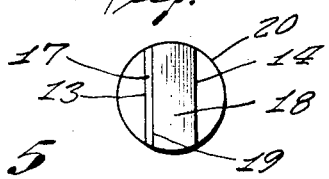
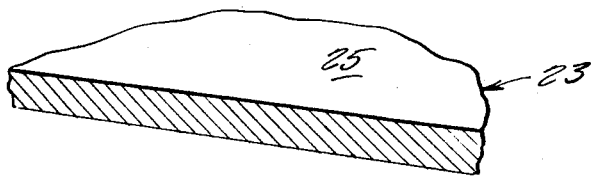
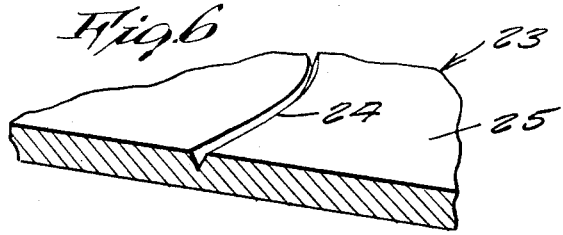
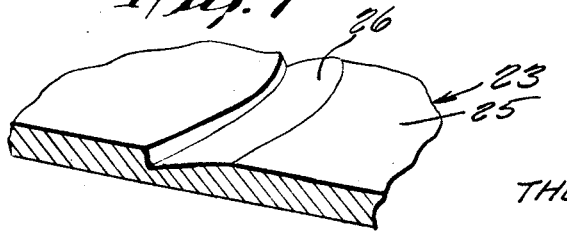
INVENTOR
THOMAS A. MOORE United States Patent Office 3,400,458
Patented Sept. 10, 1968

3,400,458
LEATHERCRAFT TOOL
Thomas A. Moore, Sulphur, Okla.
(2715 Alford St., Columbus, Ga. 31903)
Filed Nov. 8, 1966, Ser. No. 592,877
1 Claim. (Cl. 30—164.9)

ABSTRACT OF THE DISCLOSURE

A tool for engraving leather, the tool comprising a working head at one end of a shank, the working head including a pair of faces at an angle respective to each other and at different angles respective to an axis of the shank, the faces forming an edge therebetween which is inclined respective to the axis of the shank.

This invention relates generally to craftsmen's tools. More specifically it relates to tools used for engraving designs in the surface of leather.

A principal object of the present invention is to provide a novel leathercraft tool which performs alone the leather tooling work which at the present time can be accomplished only by the use of two separate tools.

Another object of the present invention is to provide a leathercraft tool which performs both cutting and beveling operations, thereby eliminating the necessity of separate tools to accomplish the same.

Yet another object of the present invention is to provide a leathercraft tool which according will reduce the amount of time required to tool a piece of leather.

Still another object of the present invention is to provide a leathercraft tool having self-contained means for first cutting in a pattern upon leather and thereafter bevel the cut pattern.

Other objects of the present invention are to provide a leathercraft tool which is simple in design, inexpensive to manufacture, easy to use and efficient in operation.

These and other objects will be readily evident on a study of the following specification and the accompanying drawing wherein:

FIGURE 1 is a side elevation view of the present invention;

FIGURE 2 is an end elevation view thereof;

FIGURE 3 is an opposite side elevation view thereof;

FIGURE 4 is a bottom plan view thereof;

FIGURE 5 is a fragmentary perspective view of a piece of leather shown in cross section and shown prior to tooling operation;

FIGURE 6 is a view similar to FIGURE 5 and showing the same after being cut, and FIGURE 7 is a view similar to FIGURE 6 and showing the leather after being beveled with the device.

Referring now to the drawing in detail the numeral 10 represents a leathercraft tool according to the present invention wherein there is a working head 11 integrally formed at one end of a shank 12 that is receivable within a tool handle not shown.

The working head 11 comprises a chisel-like element having parallel flat opposite sides 13 and 14, the lower edges 15 and 16 respectively of which are angularly inclined. Adjacent the edge 15 there is an angularly inclined surface 17. The surface 17 comprises a face which is relatively short in length but which extends the full width of the side 13 adjacent thereto. Adjacent the inclined edge 16, there is an angularly inclined surface or face 18 which is relatively longer in length than the face 17 and which likewise extends the full width of the side 14. The angularly inclined faces 17 and 18 converge together to form a sharp, straight edge 19 that is parallel with the inclined edges 15 and 16.

The leathercraft tool 10 may be machined from a round stock of steel from which a length is cut off and milled at one end to form the working head, and turned at the opposite end to form the shank 12, and there remaining a cylindrical portion 20 between the working head and the shank. The width of the sides 13 and 14 may be made equal to the diameter of the central portion 20 and a shoulder 21 is formed on the underside of the central portion 20 adjacent each of the sides 13 and 14. A shoulder 22 is formed upon the upper side of the central portion 20 adjacent the shank 12.

In operative use the tool 10 is applied to a piece of leather 23 in a manner so that the same will first cut a linear cut 24 into the surface 25 of the leather as is shown in FIGURE 6 of the drawing. This is accomplished by tilting the tool so that the faces 17 and 18 are each at an equal angle respective to the surface 25 of the level, the tool then either being struck on the end so to form the cut 24 or if the tool is heated, it will burn out the cut 24. Thereafter the tool is used to form the bevel 26 shown in FIGURE 7. This is accomplished by tilting the tool so that the face 18 is at a relatively very small angle respective to the surface 25, thus forming the broad surface 26 when the tool is struck or applied in heated condition.

It is of course understood that the tool may be otherwise manipulated depending upon the skill of the operator, and the cutter may be used as shown in FIGURE 2 and moved in the direction of sharp edge 19 so to produce the cut illustrated in FIGURE 6, and in order to produce the cut in FIGURE 7, the cutter may be rotated 90 degrees to the position illustrated in FIG. 3 and moved in the direction of face 18, as preferred by the operator. It is of course not necessary to first make the cut of FIG. 6 before making the cut of FIG. 7, however the cut illustrated in FIG. 6 can be more quickly accomplished and accordingly serve as a guide for forming the relatively larger cut shown in FIG. 7.

Thus it has been shown a leathercraft tool which performs both cutting and beveling operation during the tooling of leather and which will save time and produce a superior engraving.

While various changes may be made in the detailed construction it is understood such changes will be made within the scope of the present invention as is defined by the appended claim.

I claim:

1. In a leathercraft tool, the combination of a one-piece member, a working head at one end of said member, a shank at the opposite end of said member, and an intermediate portion between said working head and said shank forming shoulders adjacent thereto, said shank being receivable within the end of a tool handle for convenient manipulation of said tool during the tooling of leather, said working head comprising a chisel-like element having flat parallel opposite sides, the lower end of one of said sides being inclined and adjacent a relatively short angularly inclined face, said face extending the full width of said side, the opposite of said side having an inclined lower edge adjacent a relatively long angularly inclined face, said relatively long angularly inclined face having a width equal to said adjacent side, said relatively short or narrow face and said relatively long angularly inclined face converging together to form a sharp, straight edge which is parallel to said inclined edges between said sides and said angularly inclined faces.

References Cited

UNITED STATES PATENTS 2,524,636    10/1950    Preis et al. _____ 30—164.9

ROBERT C. RIORDON, *Primary Examiner.*

R. V. PARKER, JR., *Assistant Examiner.*